United States Patent
Ferraiolo et al.

[11] Patent Number: 5,870,404
[45] Date of Patent: Feb. 9, 1999

[54] SELF-TIMED CIRCUIT HAVING CRITICAL PATH TIMING DETECTION

[75] Inventors: Frank D. Ferraiolo, Essex Junction; John E. Gersbach, Burlington; Charles J. Masenas, Jr., Essex Junction; Norman J. Rohrer, Underhill; Bruce W. Singer, Richmond, all of Vt.

[73] Assignee: International Business Machines Corporation, Armonk, N.Y.

[21] Appl. No.: 694,120

[22] Filed: Aug. 8, 1996

[51] Int. Cl.6 .............................. G06K 5/04; G11B 5/00
[52] U.S. Cl. ...................... 371/1; 371/61; 371/62
[58] Field of Search .............. 371/1, 2, 61, 62; 327/239, 113

[56] References Cited

U.S. PATENT DOCUMENTS

| | | | |
|---|---|---|---|
| 5,208,490 | 5/1993 | Yetter | 307/452 |
| 5,329,176 | 7/1994 | Miller, Jr. et al. | 307/443 |
| 5,410,263 | 4/1995 | Waizman | 327/141 |
| 5,434,520 | 7/1995 | Yetter et al. | 326/93 |
| 5,444,405 | 8/1995 | Truong et al. | 327/239 |
| 5,451,892 | 9/1995 | Bailey | 327/113 |
| 5,455,521 | 10/1995 | Dobbelaer | 376/17 |

OTHER PUBLICATIONS

IBM/vol. 38, No. 03, Mar. 1995/Self Adjusting Multi–Frequency Dynamic Focus Circuit for Cathode Ray Tube Displays.

IBM/vol. 36, No. 10, Oct. 1993/Dynamic Clock Phase Shifter for Logic Delay Tracking.

IBM/vol. 29, No. 3, Aug. 1986/Fiber–Optic Inverter Repeater.

*Primary Examiner*—Phung M. Chung
*Attorney, Agent, or Firm*—Schmeiser, Olsen & Watts; Eugene I. Shkurko

[57] ABSTRACT

A self-timed circuit for use a clocked logic system is disclosed that comprises a timing detection device for detecting a timing margin of a critical path, the critical path being a path that limits the speed of the system. The circuit further comprises increase logic for increasing the speed of the system clock if the timing margin allows it, and decrease logic for decreasing the speed of the system clock if the timing margin indicates such a need. The increase and decrease logic comprise threshold generator and reset logic, and clock control logic.

20 Claims, 5 Drawing Sheets

| Speed | Period | delta to next speed | ps/element | elements in one clock period | 12% of period high threshold | |
|---|---|---|---|---|---|---|
| 133 MHz | 7.5nS | .8nS | 150 (assumed) | 50 | 6 | (delta + margin) |
| 150 MHz | 6.7nS | .7nS | 135 | 50 | 6 | |
| 166 MHz | 6.0nS | .5nS | 120 | 50 | 6 | |
| 181 MHz | 5.5nS | .5nS | 110 | 50 | 6 | |
| 198 Mhz | 5.0nS | | | | | |

SELF-TIMED CIRCUIT HAVING CRITICAL PATH TIMING DETECTION

BACKGROUND OF THE INVENTION

1. Technical Field

The invention relates generally to self-timed circuits, and more specifically, to self-timed circuits that detect the timing margin of critical signal paths in a clocked logic system.

2. Background Art

In a computer system, or in any other clocked logic system, the overall performance of the system is largely determined by the frequency of the system's clock signal. As the frequency, and thus the speed of the clock signal increases, the time required to execute system applications decreases. The speed of the system clock signal is limited, though, by the slowest components and/or chips that may be contained in the system, each component having a certain maximum speed at which it can safely operate. Thus, the clock signal frequency is generally determined by the worse case speed of the slowest possible components to ensure that the system will operate over the entire range of temperature and power supply. If the speed of a component barely falls short of one particular speed (e.g., 150 MHz), the whole system must be placed at the next lower speed (e.g., 133 MHz), which would be detrimental to the performance of the system.

To overcome the problem of limiting a system to the worse case speed of its components, self-timed circuits were used in clocked systems to dynamically change the speed of the clock. U.S. Pat. No. 5,451,892, "Clock Control Technique and System for a Microprocessor including a Thermal Sensor," issued September 1995 to Bailey discloses a circuit that monitors the temperature of the system and when certain thresholds are met, will change the frequency of the clock signal. Although the temperature is important in determining the speed at which the system component's may operate, other factors, such as voltage, may also be involved that would cancel out the effects of the temperature factor, thus causing the frequency of the clock to be incorrectly determined.

Other examples of clocked systems that are dynamically self-timed include: U.S. Pat. No. 5,455,521, "Self-Timed Interconnect Speed-Up Circuit," issued October 1995 to Dobbelaere; U.S. Pat. No. 5,329,176, "Self-Timed Clocking System and Method for Self-Timed Dynamic Logic Circuits," issued July 1994 to Miller, Jr. et al.; and U.S. Pat. No. 5,434,520, "Clocking Systems and Methods for Pipelined Self-Timed Dynamic Logic Circuits," issued Jul. 18, 1995 to Yetter et al. The above-mentioned patents disclose self-timed systems, but they do not take into account all the factors that can slow down, or speed up a clocked logic system.

Accordingly, a need has developed in the art for a self-timed circuit for a clocked logic system with dynamic sensing that will adjust the speed of a clock according to the timing margin of the components in a particular system, thus permitting the system to operate at the fastest speed the components and environment allow.

SUMMARY OF THE INVENTION

It is thus an advantage of the present invention to provide a self-timed circuit that will adjust the speed of a clock according to the timing margin of the particular components of a clocked logic system.

It is also an advantage of the present invention to provide a self-timed circuit that has real-time dynamic sensing for permitting the system to operate at the fastest speed the components and environment allow.

The foregoing and other advantages of the invention are realized by a self-timed circuit for use in a clocked logic system comprising a timing detection device for detecting a timing margin of a critical path, the critical path being a path that limits the speed of the system, "increase" logic for increasing the speed of the system clock if the timing margin allows it, and "decrease" logic for decreasing the speed of the system clock if the timing margin indicates that the system clock speed must be decreased. The increase and decrease logic comprise threshold generator and reset logic, and clock control logic.

The foregoing and other objects, features, and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DETAILED DESCRIPTION OF THE DRAWINGS

Figure 1:
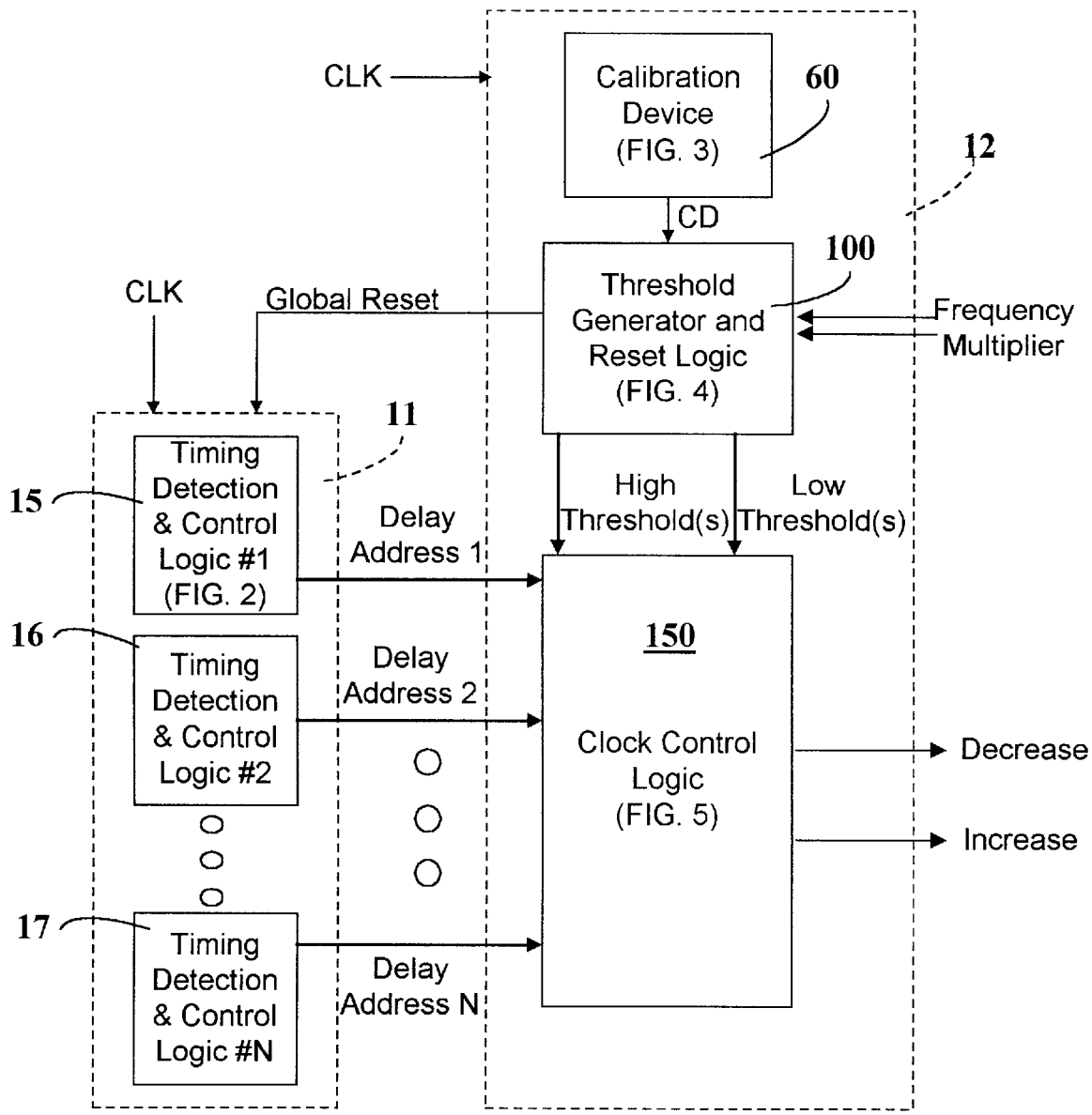
FIG. 1 is a block diagram of a self-timed circuit of a microprocessor in accordance with a preferred embodiment of the present invention.

Referring to FIG. 1, a clocked logic system, such as a microprocessor system, having a self-timed circuit 10 comprises Timing Detection and Control Logic (TDCL) devices 11, and Global devices 12 including Calibration Device 60, Threshold Generator and Reset Logic 100, and Clock Control Logic 150. All registers and counters shown in this invention are clocked with the system clock, unless otherwise specified.

Each TDCL device (15, 16, 17) monitors a critical signal path of the system, determines the amount of delay, or timing margin for that signal path, and outputs a delay address indicative of that timing margin. As aforementioned, a critical path of a system is a path that limits the speed of the system. The number of TDCL devices in the system will depend on the number of critical paths that are to be monitored.

Clock Control Logic 150 receives the delay addresses from the TDCL devices 11 and at least one high and low threshold address from the Threshold Generator 100 and determines whether the clock speed should be increased, decreased, or stay the same. Thus, if there is sufficient timing margin to allow the clock speed to be increased, Clock Control Logic 150 will increase the clock speed through the Increase signal. If the timing margin is small, then there is little margin in the critical path at the present clock speed and Clock Control Logic 150 will decrease the clock speed through the Decrease signal. If the timing margin is large enough to safely maintain the present speed but not sufficiently large to support a higher frequency, Clock Control Logic 150 will output no signal and the speed will remain the same. Although the clock speed is the element referred to in this application as being increased and decreased, one skilled in the art should recognize that other elements, such as the power supply, or fan speed, may also be increased and decreased to optimize the performance of the system.

Threshold Generator and Reset Logic 100 determines the low and high threshold for a change in the system clock speed, the low threshold representing the minimum value to guarantee safe operation of the system, and the high threshold representing the maximum value to guarantee safe operation of the system while ensuring that the next higher speed can be reached with some amount of safety margin. Inputted into Threshold Generator and Reset Logic 100 is the Calibration Device 60 (CD) address and the system's frequency multiplier, indicating the system's speed of operation. Both inputs are used in the determination of the threshold values, as discussed in more detail below. A Global Reset is also generated from Threshold Generator and Reset Logic 100. The Threshold Generator and Reset Logic 100 and Clock Control Logic 150 make up the increase and decrease logic for the self-timed circuit, increasing and decreasing the clock speed as outlined above.

Calibration Device 60 indicates the number of delay elements in a clock period by using the system's clock period as a measure of time, as discussed in more detail below. The CD address, outputted from Calibration Device 60, is inputted into Threshold Generator and Reset Logic 100. The details of the aforementioned devices are described below in reference to FIGS. 2–5.

Figure 2:
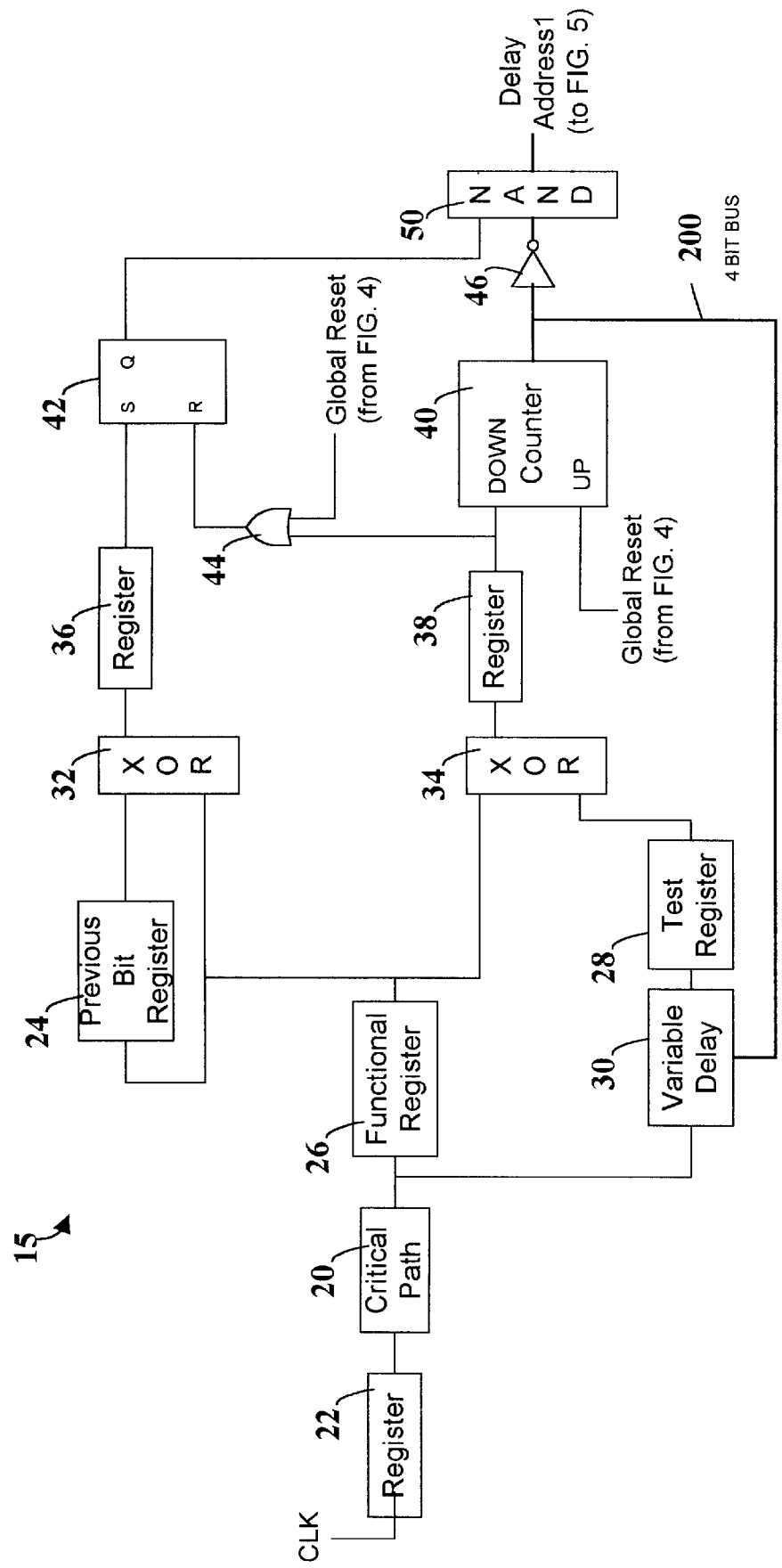
FIG. 2 is a block diagram of the Timing Detection and Control Logic of FIG. 1.

TDCL device 15 of FIG. 1 is characterized in FIG. 2. As shown in FIG. 2, TDCL device 15 comprises an input register 22, such as a master/slave (M/S) latch, coupled to system clock CLK and to critical path 20. Critical path 20 is then coupled to functional register 26 and a variable delay device 30 having multiple delay elements, which in turn is coupled to test register 28. The output of functional register 26 (the functional signal path) is compared to the output of test register 28 (the delayed signal path) through XOR gate 34. If the two registers contain the same value, then the timing margin of critical path 20 is at least the value of the delay in variable delay device 30 (relative to the present system clock) and a zero is outputted. If the two registers "miscompare" (do not have the same value) then the timing margin of critical path 20 plus the delay value of the variable delay device 30 is greater than the clock cycle time, and XOR gate 34 will output a one to register 38.

The output of register 38 is coupled to the DOWN input of counter 40, causing the delay value in variable delay device 30 to be reduced (i.e., a different delay element in variable delay device 30 is selected that will output a smaller delay) when functional register 26 and test register 28 miscompare. The UP input to counter 40 receives the Global Reset signal from FIG. 4, causing the delay value in variable delay device 30 to be increased. Thus, in operation, counter 40 continues to increase the delay value of variable delay 30 until the value of the variable delay device 30 is greater than the timing margin of critical path 20. Consequently, registers 26 and 28 will miscompare, XOR gate 34 will output a one, and counter 40 will decrement the variable delay device 30 to the delay value just before registers 26 and 28 miscompare. This particular delay value indicates when the sum of critical path 20 and variable delay device 30 is equal to one clock period. The delay value of the variable delay device 30 will then represent the timing margin at the specific conditions under which a chip (monitored through critical path 20) is operating. The output of counter 40 is then inverted through inverter 46, inputted with the Q output of Set/Reset (SR) latch 42 into NAND gate 50, and then outputted as Delay Address1.

The output of functional register 26 is also compared by XOR gate 32 to the previous output of the functional register, which is stored in previous bit register 24. The previous bit register 24 and XOR gate 32 are used to determine if data from critical path 20 has changed from the previous cycle. That is, when functional register 26 and test register 28 contain the same value, two conditions can occur. The first condition occurs when the data from critical path 20 remained the same over multiple cycles. In this case, no information is available. XOR gate 32 outputs a zero, which is latched through register 36 and inputted into SR latch 42. SR latch 42 will then output a zero that will block NAND gate 50 from outputting Delay Address1.

The second condition occurs when the data from critical path 20 did not remain the same, but the value of the data in registers 26 and 28 are the same. In this second case, the comparison of registers 26 and 28 is valid and there is a timing margin of at least the value in the variable delay device 30. XOR gate 32 outputs a one, which is latched through register 36 and inputted into SR latch 42. SR latch 42 then outputs a one that will allow NAND gate 50 to output Delay Address1.

SR latch 42 is reset through OR gate 44 comprising Global Reset input (from FIG. 4) and an input from the output of register 38. Thus, when a miscompare occurs, the SR latch is reset to indicate that valid samples did not take place.

Another embodiment of the TDCL device 15 includes a counter (not shown) added between SR latch 42 and register 36. The counter would ensure some minimum number of valid compares took place between global reset time periods as discussed below.

Figures 3, 6:
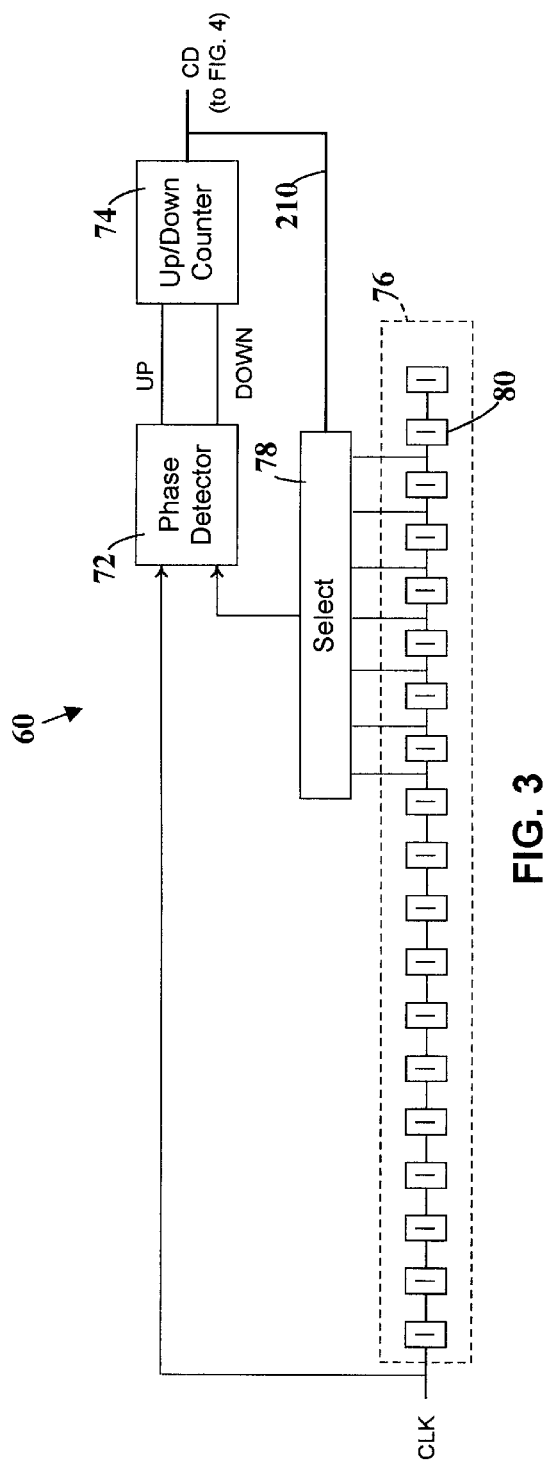
FIG. 3 is a block diagram of the Calibration Device of FIG. 1.
FIG. 6 is a chart illustrating one example used by FIG. 1 in accordance with the present invention.

The details of Calibration Device 60 of FIG. 1 is illustrated in FIG. 3. As shown in FIG. 3, the system clock CLK is passed into delay line 76 of Calibration Device 60, which contains similar delay elements 80 as those found in variable delay device 30 (FIG. 2). The number of delay elements in one clock period is determined through Calibration Device 60. A delayed clock is selected through select device 78, and then compared to CLK through phase detector 72. If the phase of the selected delayed clock is early with respect to the phase of CLK, then the phase detector outputs an UP signal into Up/Down Counter 74, which causes select device 78 to choose a delayed version of the clock later than the one previously measured to be early. Similarly, if the phase of the selected delayed clock is late with respect to the phase of CLK, a DOWN signal is outputted, and an earlier delayed clock is chosen by select device 78. This process is repeated until the clock phase closest to the phase of the input clock CLK is found, thus determining the number of delay elements in one clock period. The output of Up/Down Counter 74, CD, is inputted into FIG. 4. A local calibration device could also be implemented at each TDCL device to improve tracking with the variable delay elements. Thus, the variable delay elements of FIG. 2 and the additional delay elements necessary to equal one clock period could be incorporated for each TDCL.

Figure 4:
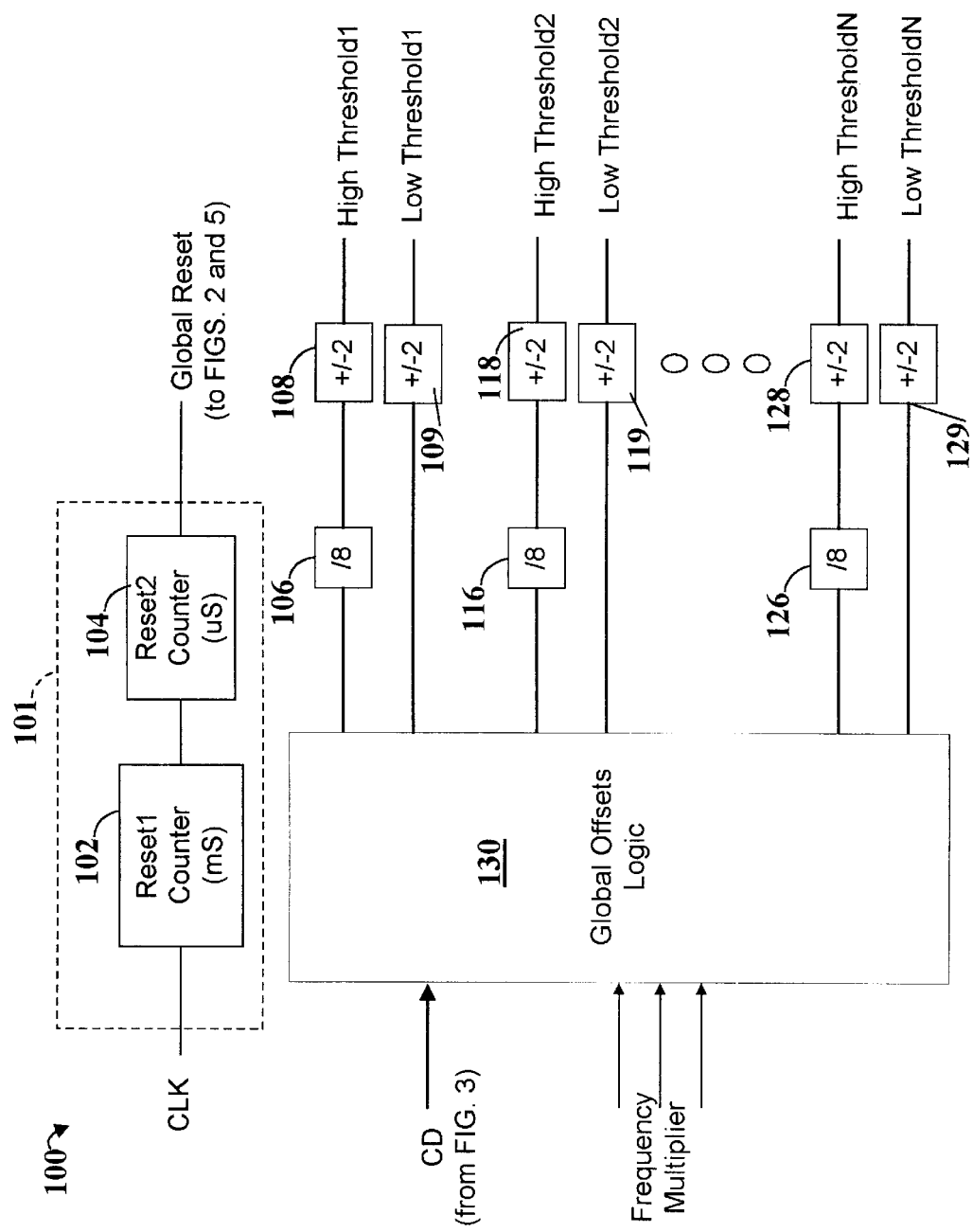
FIG. 4 is a block diagram of the Threshold Generator and Reset Logic of FIG. 1.

In FIG. 4, the Threshold Generator and Reset Logic 100 of FIG. 1 is shown. The reset logic 101 comprises two reset counters, Reset1 Counter 102 and Reset2 Counter 104, Reset1 Counter 102 dictating the amount of time to occur between Global Reset signals, and Reset2 Counter 104 dictating the length of time of the Global Reset signal. Hence, after a pre-programmed amount of time, such as after 1 mS in clock cycles, the Reset Logic 100 interrogates the state of all the TDCL devices 11. The amount of time should be small relative to the thermal time constant of the chip the TDCL devices 11 are located on. Reset2 Counter 104 is normally in the microseconds (uS), such as 1 uS.

Threshold Generator and Reset Logic 100 further comprises Global Offset Logic 130, which receives the CD input from FIG. 3, and a frequency multiplier from the system. As aforementioned, the frequency multiplier is used to determine the present system clock speed. The frequency multiplier is then used by Global Offset Logic 130 to generated any global offsets in the thresholds. The high threshold (or thresholds) are generated by dividing the CD input by eight (106, 116, and 126). They can be further manipulated by adding or subtracting two (±2) (108, 118, and 128) to adjust for tracking, or other offsets. The low threshold (or thresholds), which generally is one or two delay elements, may also be modified by ±2 (109, 119, 129). The ±2 modification of the high and low thresholds allows for individual customization of each threshold, thus allowing for offset variations among the TDCL devices 11 (FIG. 1). For example, instead of monitoring the critical path of a system, the TDCL device may monitor a signal path that may be adjusted to imitate the speed of the critical path. The thresholds for that particular TDCL device will then be individually customized to adjust the generated offsets.

Figure 5:
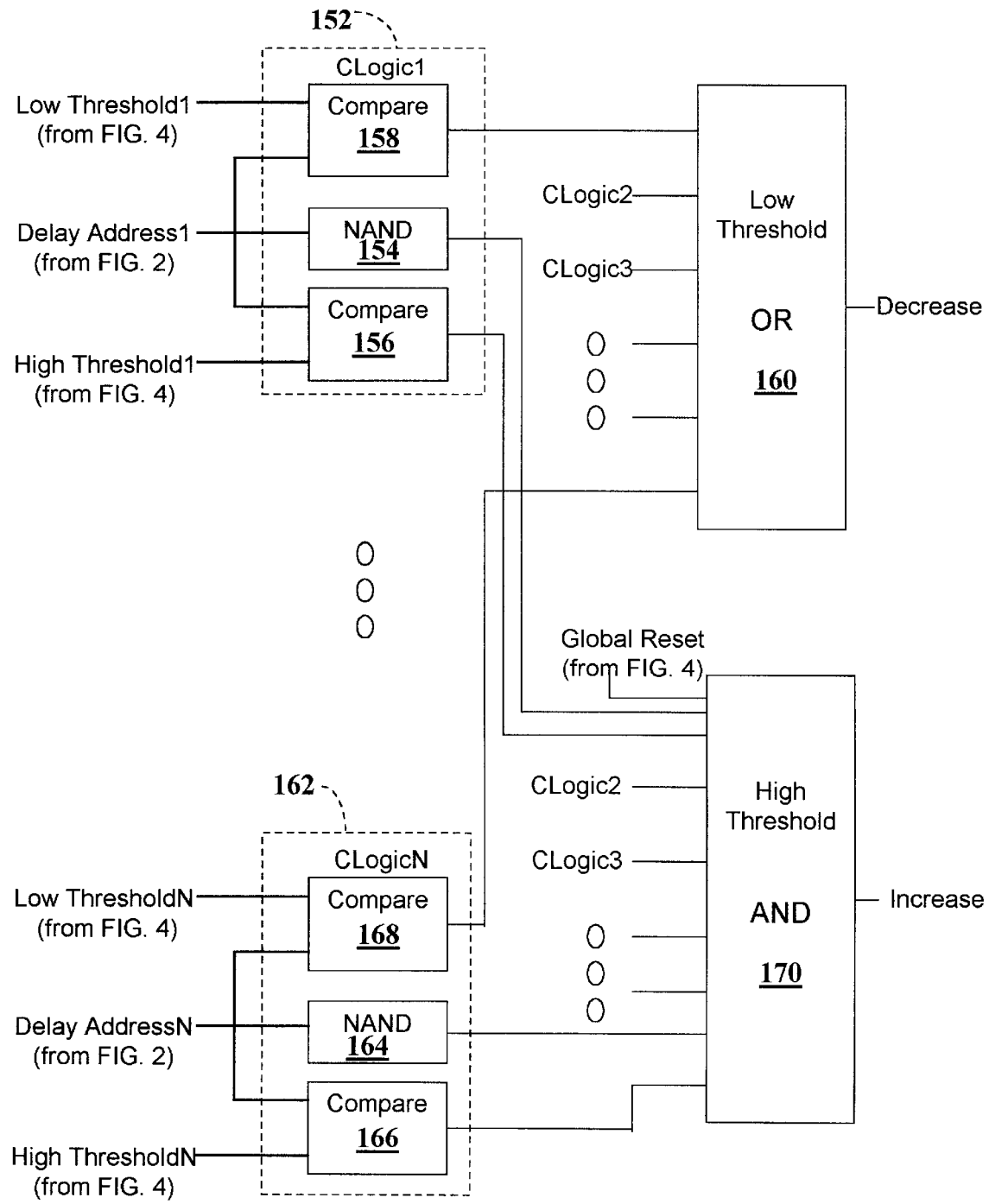
FIG. 5 is a block diagram of the Clock Control Logic of FIG. 1.

FIG. 5 illustrates the Clock Control Logic 150 of FIG. 1. Clock Control Logic 150 comprises Compare Logic (CLogic) devices, CLogic1 152 to CLogicN 162. The number of CLogic devices are equal to the number of TDCL devices 11 (FIG. 1). The Delay Addresses from the TDCL devices, and the low and high thresholds generated in FIG. 4 are inputted into CLogic devices 152, 162. If only one low and one high threshold are generated in FIG. 4, then each CLogic device would receive the same low and high threshold. CLogic1 device 152, as with each CLogic device, is made up of two compare devices 158 and 156, and NAND gate 154. Low Threshold1 is compared with Delay Address1 through compare device 158. High Threshold1 is compared with Delay Address1 through compare device 156. Delay Address1 inputs into NAND gate 154.

The outputs of compare devices 158, 168, etc. are inputted into a Low Threshold OR gate 160. The outputs of compare devices 156, 166, etc., and NAND gates 154, 164, etc. are inputted into a High Threshold AND gate 170. Thus, when one of the inputs of OR gate 160 are one, meaning the delay address of any of the TDCL devices is below a low threshold, there is not sufficient timing margin to maintain the current speed and the design is operating too close to failure. The system clock speed will then be decreased. Similarly, when all the inputs of AND gate 170 are ones, meaning the delay addresses of all the TDCL devices are equal to or above the high threshold and valid, there is sufficient timing margin to allow a faster cycle time. The system clock speed will then be increased. Finally, if the delay addresses are below the high threshold and above the low threshold, then the system will maintain the present speed.

As aforementioned, if a change in state has not occurred for any of the TDCL devices 11 (FIG. 1) the delay addresses will be all ones since each bit in FIG. 2 is inputted into a NAND gate with the SR Latch (representing a change in state). If any of the delay addresses indicates that no valid compares took place (a delay address of all ones) over the Global Reset time period then no information is available, hence no action can be taken relative to determining timing margin and AND gate 170 would be gated inactive. This condition could be used to invoke a test pattern that would exercise the critical path so that a test can be made.

FIG. 6 illustrates a numerical example of the values obtained when using an embodiment of the present invention. One skilled in the art will recognize that the values shown are for this particular example only and the invention is not limited to such. Other appropriate values may also be used. The speed column represents discrete speeds of system operation in MHz. Typically the speed range is quite wide, the set shown consisting of 133 MHz, 150 MHz, 166 MHz, 181 MHz, and 198 MHz, but a smaller speed range, such as for a continuous increase or decrease of speed, may also be used. The period column displays the period of the clock for each of the speeds. The change, or delta in nS from the present clock period to the next higher clock period is shown in the delta to next speed column. The ps/element column illustrates the picoseconds (ps) per delay element, with the delay element of 150 pS being assumed (i.e., 7.5 nS/50 elements). The next column shows the elements in one clock period, as calculated in the Calibration Device 60 (FIG. 3). The final column shows the result of dividing the clock delay address (CD) by eight, as done in the Threshold Generator 100 of FIG. 4. A result of approximately 12% of the cycle time is obtained for the high threshold, which is approximately 6. As aforementioned, the high threshold should be large enough to ensure that the next higher speed can be reached with some amount of safety margin. The low threshold, or minimum value to guarantee safe operation, could simply be one or two delay elements.

Thus, with the disclosed invention, a self-timed circuit is provided that will adjust the speed of the system clock according to the timing margin of a critical signal path. Furthermore, if external factors, such as temperature and power supply, change the overall speed of the system, this invention can adjust the speed of the clock accordingly without having to monitor all external factors. In addition, since the signal path itself is being monitored in the present invention, the actual delay of the device can be measured instead of calculated and the extra means necessary for correlating an external factor, such as temperature, to the actual delay of that path is not needed. Hence, the signal path that is monitored through the present invention will reflect all changes in speed and timing margin regardless of what factors are involved in changing the system.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for use in a clocked logic system comprising:
    timing detection means for determining a timing margin in a signal path of said system;
    increase logic means, responsive to said timing detection means, for increasing a system clock speed when said timing margin is such that said system clock speed can be safely increased; and
    decrease logic means, responsive to said timing detection means, for decreasing said system clock speed when said timing margin is such that said system clock speed must be decreased.

2. The circuit of claim 1, wherein said increase logic means comprises:
   threshold generator means for generating at least one high and at least one low threshold; and
   clock control means, coupled to said threshold generator means and said timing detection means, for generating an increase signal or a decrease signal from said at least one high and low threshold and said timing margin.

3. The circuit of claim 2, further comprising calibration means, coupled to said threshold generator means, for calibrating a delay signal for generation of said high and low threshold by said threshold generator means.

4. The circuit of claim 2, wherein said clock control means further comprises:
   a first compare means for comparing said at least one high threshold with said timing margin; and
   a second compare means for comparing said at least one low threshold with said timing margin,
   wherein said first compare means outputs an indication that the timing margin is such that said system clock speed can be safely increased and said second compare means outputs an indication that the timing margin is such that said system clock speed must be decreased.

5. The circuit of claim 4 wherein said clock control means further comprises: an OR gate, coupled to said first compare means, for decreasing said system clock speed when at least one input indicates that said system clock speed must be decreased.

6. The circuit of claim 4 wherein said clock control means further comprises: an AND gate, coupled to said second compare means, for increasing said system clock speed when all inputs indicate that said system clock speed may be increased.

7. The circuit of claim 1, wherein said timing detection means comprises:
   a functional register, coupled to said signal path, for latching said signal path;
   a variable delay device, coupled to said signal path, for generating a delayed path from said signal path;
   a test register, coupled to said variable delay device for latching said delayed path; and
   a compare device, coupled to said functional register and said test register, for comparing said signal path to said delayed path,
   wherein said timing margin is determined when said signal path and said delayed path equals one clock period of a system clock.

8. A method of optimizing a clock speed of a clocked logic system comprising the steps of:
   a) determining with a timing detection means a timing margin in a signal path of said system;
   b) increasing with a increase logic means a system clock speed when said timing margin is such that said system clock speed can be safely increased; and
   c) decreasing with a decrease logic means said system clock speed when said timing margin is such that said system clock speed must be decreased.

9. The method of claim 8, wherein step a) further comprises the steps of:
   a1) generating a delayed path from said signal path;
   a2) comparing said signal path to said delayed path; and
   a3) generating said timing margin when said signal path and said delayed path equals one clock period of a system clock.

10. The method of claim 9, further comprises the steps of:
    a4) checking the validity of said timing margin; and
    a5) blocking an output of said timing margin if said timing margin is not valid.

11. The method of claim 8, wherein step b) further comprises the steps of:
    b1) providing a high threshold for said timing margin;
    b2) comparing said high threshold with said timing margin; and
    b3) increasing said system clock speed when all comparisons indicate that said system clock speed may be safely increased.

12. The method of claim 8, wherein step c) further comprises the step of:
    b1) providing a low threshold for said timing margin;
    b2) comparing said low threshold with said timing margin; and
    b3) decreasing said system clock speed when any comparisons indicate that said system clock speed must be decreased.

13. A microprocessor system having a self-timed circuit, said system comprising:
    timing detection means for determining a timing margin in a signal path of said system;
    increase logic means, responsive to said timing detection means, for increasing a system clock speed when said timing margin is such that said system clock speed can be safely increased; and
    decrease logic means, responsive to said timing detection means, for decreasing said system clock speed when said timing margin is such that said system clock speed must be decreased.

14. The system of claim 13, wherein said increase logic means and said decrease logic means comprise:
    threshold generator means for generating at least one high and at least one low threshold; and
    clock control means, coupled to said threshold generator means and said timing detection means, for generating an increase signal or a decrease signal from said at least one high and low threshold and said timing margin.

15. The system of claim 14, further comprising calibration means, coupled to said threshold generator means, for calibrating a delay signal for generation of said high and low threshold by said threshold generator means.

16. The system of claim 14, wherein said clock control means further comprises:
    low threshold with said timing margin,
    wherein said first compare means outputs an indication that the timing margin is such that said system clock speed can be safely increased and said second compare means outputs an indication that the timing margin is such that said system clock speed must be decreased.

17. The system of claim 16 wherein said clock control means further comprises: an OR gate, coupled to said first compare means, for decreasing said system clock speed when at least one input indicates that said system clock speed must be decreased.

18. The system of claim 16 wherein said clock control means further comprises: an AND gate, coupled to said second compare means, for increasing said system clock speed when all inputs indicate that said system clock speed may be increased.

19. The system of claim 13, wherein said timing detection means comprises:

a functional register, coupled to said signal path, for latching said signal path;

a variable delay device, coupled to said signal path, for generating a delayed path from said signal path;

a test register, coupled to said variable delay device for latching said delayed path; and a compare device, coupled to said functional register and said test register, for comparing said signal path to said delayed path, wherein said timing margin is determined when said signal path and said delayed path equals one clock period of a system clock.

20. The system of claim 19 wherein said timing detection means further comprises: a change-in-state means, coupled to said functional register, for checking the validity of said timing margin.

* * * * *